United States Patent
Lee

(12) 
(10) Patent No.: US 6,373,854 B1
(45) Date of Patent: Apr. 16, 2002

(54) INTER-TERMINAL COMMUNICATION PROTOCOL METHOD

(75) Inventor: Hoon-Ki Lee, Seoul (KR)

(73) Assignee: Samsung Electrics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/280,860

(22) Filed: Mar. 30, 1999

(51) Int. Cl.[7] .................................................. H04J 3/16
(52) U.S. Cl. ...................................... 370/466; 709/237
(58) Field of Search ............................... 370/466, 465, 370/401, 467, 296; 375/222; 709/227, 228, 230, 237, 249

(56) References Cited

U.S. PATENT DOCUMENTS 4,680,781 A * 7/1987 Amundson et al. ............ 375/8
4,953,210 A * 8/1990 McGlynn et al. ............. 380/48
5,418,842 A * 5/1995 Cooper .......................... 379/98
6,014,440 A * 1/2000 Melkild et al. .............. 379/269

* cited by examiner

Primary Examiner—Douglas Olms
Assistant Examiner—Ken Vanderpuye
(74) Attorney, Agent, or Firm—Sughrue Mion, PLLC

(57) ABSTRACT

An inter-terminal communication protocol method in which a terminal determines whether the other terminal uses an identical predetermined protocol by sending a bit stream which does not violate a standard protocol before a negotiation of the standard protocol. If the terminals use the same predetermined protocol, the negotiation is omitted, necessary information ordinarily obtained from the negotiation is detected from a prepared information table, and then communication starts. If the other terminal does not use the identical predetermined protocol, the negotiation is initiated.

3 Claims, 2 Drawing Sheets

PRIOR ART

INTER-TERMINAL COMMUNICATION PROTOCOL METHOD

BACKGROUND OF THE INVENTION

1. Field of the Invention

The present invention relates to a communication method, and in particular, to an inter-terminal communication protocol method.

2. Description of the Related Art

Many communication protocols are available which are standardized according to inherent communication characteristics. Standard protocols are to some extent inefficient in their use of time because communication in a standard protocol involves a request-response negotiation. However, compatibility between terminals of different manufacturers cannot be assured without conforming to the standard protocol.

For multimedia communication between terminals which have been manufactured by different companies, the terminals should support a standard protocol, which sometimes requires a long negotiation period due to the communication compatibility provided by the standard protocol. But this causes users of terminals of the same manufacturer to wait until the required negotiation is completed.

As described above, since a conventional inter-terminal communication should be performed in conformity with a standard protocol in order to maintain compatibility between terminals of different manufacturers according to the requirement of a negotiation prior to communication, it takes some time for terminals to initiate communication.

SUMMARY OF THE INVENTION

It is an object of the present invention, therefore, to provide an inter-terminal communication protocol method for enabling rapid communication between terminals of the same manufacturer while ensuring compatibility between terminals of different manufacturers.

The above object is achieved by providing an inter-terminal communication protocol method. In the protocol method, a terminal determines whether the other terminal uses an identical predetermined protocol by sending a bit stream which does not violate a standard protocol before a negotiation process of the standard protocol. If the Is terminals use the same predetermined protocol, the negotiation process is omitted, necessary information otherwise obtained from the negotiation is detected from a prepared information table, and then communication starts. If the other terminal does not use the identical predetermined protocol, the process of standard negotiation is initiated.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE PREFERRED EMBODIMENT

A preferred embodiment of the present invention will be described in detail with reference to the attached drawings.

It is to be appreciated that the present invention is applied, by way of example, to an international standard control protocol H.245 for multimedia communication, for better understanding of the present invention.

Figure 1:
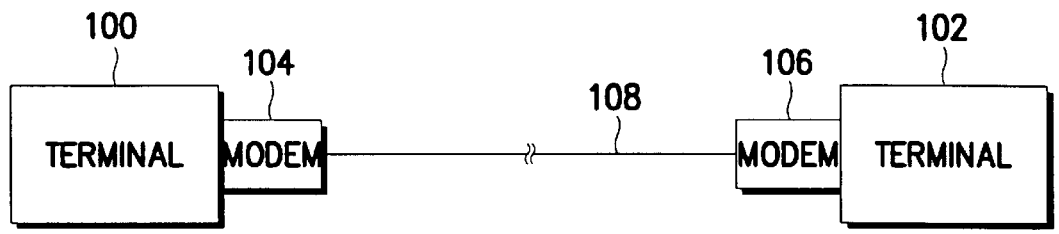
FIG. 1 is a view of terminals for inter-terminal communication in conformity with a protocol H.245.

FIG. 1 is a view illustrating terminals connected to each other for communication based on H.245. In FIG. 1, two terminals 100 and 102 are connected to each other through their respective modems 104 and 106 mutually connected by a link 108.

Figure 2:
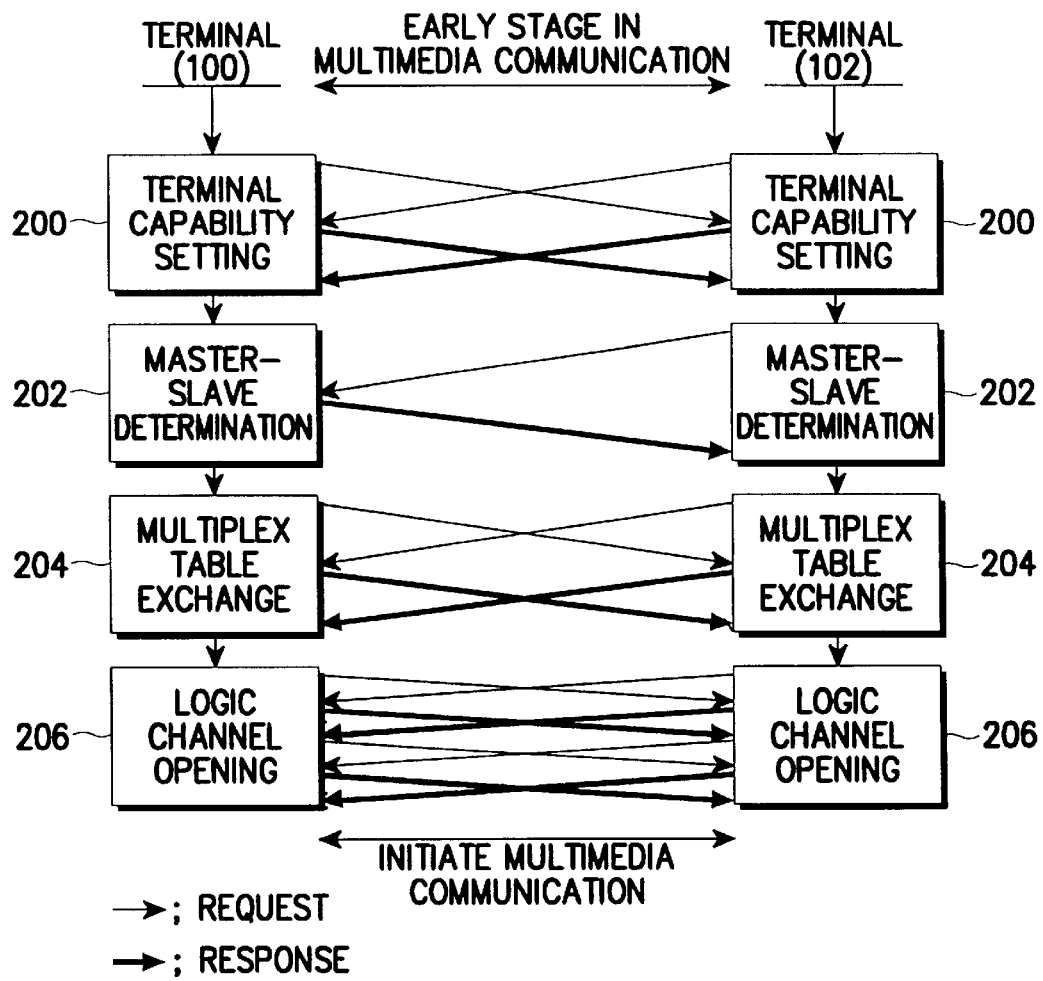
FIG. 2 illustrates a negotiation procedure in conformity with H.245.

In an early stage of an H.245-based multimedia communication, the terminals 100 and 102 are brought into a negotiation as shown in FIG. 2. A typical protocol involves a negotiation in which one part notifies the other part of its status and deals with the informed status of the other party. H.245 provides that information needed for multimedia communication is exchanged largely in four steps: terminal capability exchange (step 200), master-slave determination (step 202), multiplex table exchange (step 204), and logical channel establishing (step 206). The terminals cannot conduct a multimedia communication until they are satisfied with a negotiation including these steps. In this way, H.245 allows terminals of different manufacturers to communicate. The protocol is generalized and includes the four-step negotiation taking usually about four to eight seconds after modem connection. Users should wait until this negotiation ends.

On the other hand, terminals of the same manufacturer can initiate a multimedia communication in a shorter time by a predetermined protocol rather than the above standard protocol.

Hence, the present invention suggests a novel protocol which conforms to a standard protocol but ensures a remarkably rapid communication. Compatibility in inter-terminal communication can be achieved by implementing a standard protocol for terminals of different manufacturers and a predetermined protocol specific to a manufacturer for terminals of the same manufacturer.

Figure 3:
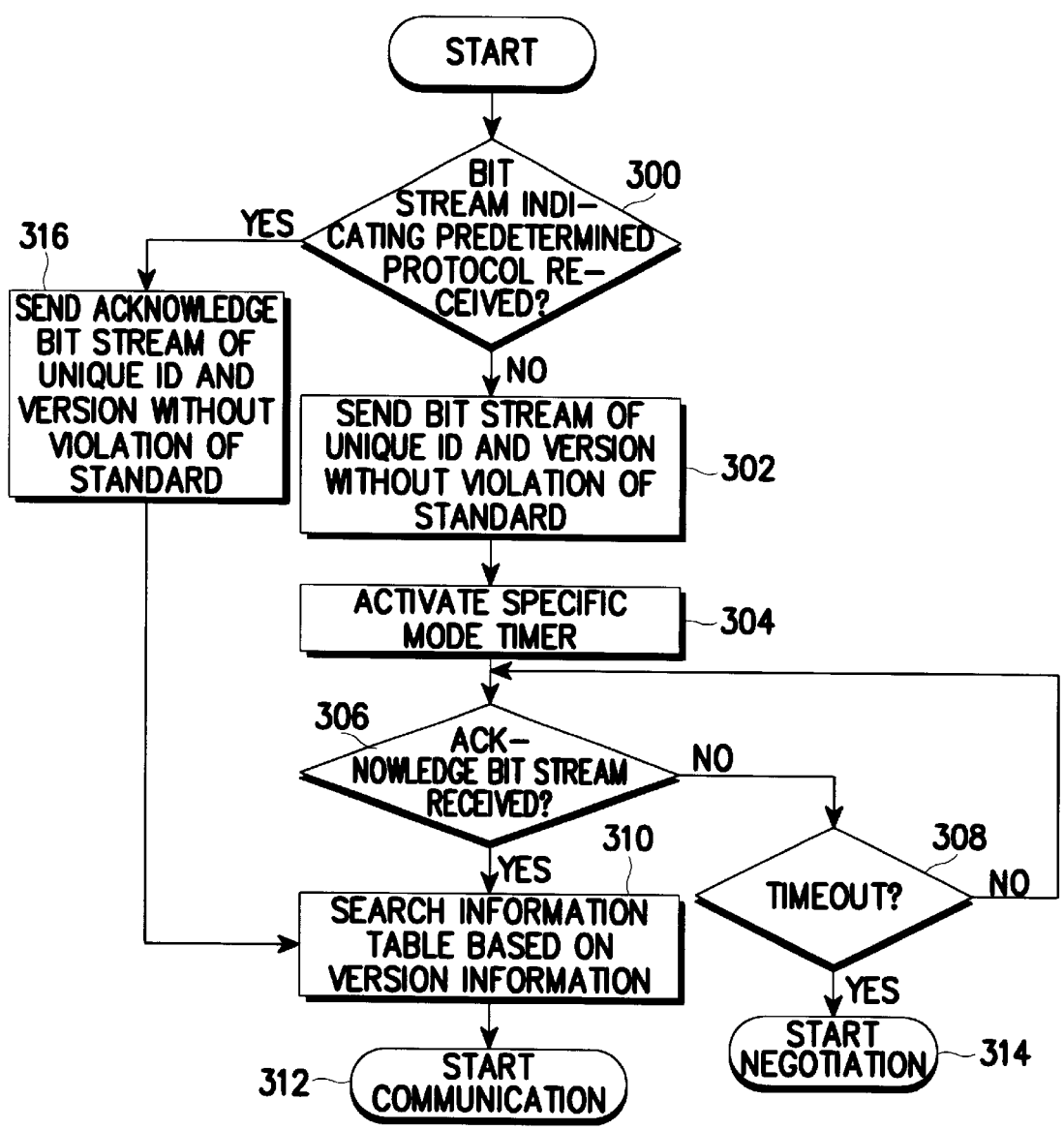
FIG. 3 is a flowchart of a process which implements a protocol according to an embodiment of the present invention.

FIG. 3 is a flowchart of the novel protocol according to an embodiment of the present invention. This procedure is confined to terminals employing the protocol of the present invention.

Prior to a description of the novel protocol, it should be understood that a terminal sends the other terminal a bit stream which does not violate a standard protocol, in an early stage before initiating the standard protocol. The bit stream is so constituted that even if the other terminal is made by a different manufacturer and cannot interpret the bit stream, the bit stream is simply neglected without impairing normal operation of the standard protocol. This bit stream contains a unique ID assigned to the manufacturer and the version of the terminal.

For example, H.245 generates a bit stream under a packet encoding rule X.691 defined by an encoding syntax ASN.1 of ITU-T (International Telecommunication Union-Telecommunication Standardization Sector). As defined by X.691, any bit stream can be interposed in an extension mark, namely ". . . ". Message definitions in H.245 are shown as follows.

```
Multimedia System Control Message ::=CHOICE
{
    request        Request Message,
    response       Response Message,
```

-continued

```
    command             Command Message,
    indication          Indication Message,
    ...
}
Request Message::=CHOICE
{
    nonstandard
                        Nonstandard
                        Message,
    master slave determination   Mater
                        Slave Determination,
    terminal capability set      Terminal
                        Capability Set,
    :
    :
    round trip delay request     Round
                        Trip Delay Request,
    maintenance loop request
                        Maintenance
                        Loop Request
    ...
}
```

For example, the following information based on ASN.1 is inserted into the extension mark "...".

```
Samsung Only Message::=SEQUENCE
{
    vendor identifier    OBJECT
                         IDENTIFIER,
    version              :  :  =
                         INTEGER (1..65535)
}
Samsung Only Message Ack::=SEQUENCE
{
    vendor identifier    OBJECT
                         IDENTIFIER,
    version              :  :
                         INTEGER
}
``` where OBJECT IDENTIFIER is the unique ID of a manufacturer and :: =INTEGER (1 . . . 65535) is the version of a terminal.

Since the above information is not interpreted in a terminal of a different manufacturer conforming to a standard protocol, the X.691-based bit stream can be used without the concern of affecting the normal operation of the standard protocol. Thus, a new defined message is

```
Multimedia System Control Message:: =CHOICE
    request              Request Message,
    response             Response Message,
    command              Command Message,
    indication           Indication Message,
    ...
    Samsung Only Message,
    Samsung Only Message Ack,
}
```

Assuming that "request" is "01 xxx . . . ", "response" is "02 xxx . . . ", "command" is "03 xxx . . . ", and "indication" is "04 xxx . . . ", "Samsung_" is "05 xxx . . . " and "06 xxx . . . ", which is neglected by the other terminal following the standard protocol.

Terminals of the same manufacturer should have decoders for interpreting the bit stream. That is, X.691 encoders and X.691 decoders should be set in such a way as to send and interpret the bit stream in the terminals 100 and 102. Upon reception of this bit stream, a terminal can determine whether the other terminal has the same manufacturer from the manufacturer ID and version information. If they are of the same manufacturer, the other terminal sends a bit stream which does not violate the standard protocol as an acknowledge signal Ack to the terminal. This bit stream also contains the encoded manufacturer ID and version information.

Now referring to FIG. 3, if both the terminals 100 and 102 are of the same manufacturer, using the novel protocol of the present invention, a terminal 100 (or 102) determines whether it receives a bit stream representative of a predetermined protocol specific to the manufacturer in step 300, in an early stage before initiating the standard protocol. If the bit stream is not received, the terminal 100 sends the other terminal 102 a bit stream representative of the predetermined protocol, that is, a bit stream containing a manufacturer ID and a version which is encoded not to violate the standard protocol, in step 302. In steps 304 to 308, the terminal 100 awaits the acknowledge bit stream Ack from the other terminal 102, for a predetermined time.

In step 304, a specific mode timer is activated to check the predetermined timeout period and, in step 306, it is determined whether the acknowledge bit stream Ack is received. If it is not, it is determined whether the predetermined timeout period is expired in step 308. If the timeout period is not expired, the procedure returns to step 306. Then, if the acknowledge bit stream Ack is not received until the expiration of the timeout, the terminals 100 and 102 are brought into a negotiation as provided in the standard protocol, in step 314. If the other terminal 102 does not use the predetermined protocol, the terminal 102 neglects the bit stream and the negotiation starts. On the contrary, if the acknowledge bit stream Ack is received before the timeout period is expired, the negotiation is omitted and information, which might otherwise be obtained from the negotiation, is detected from an information table prepared by the manufacturer in connection with the version information, in step 310. Then, a communication starts in step 312.

Meanwhile, if the terminal 100 receives the bit stream representative of the predetermined protocol from the other terminal 102 in step 300, the terminal 100 sends the other terminal 102 the acknowledge bit stream Ack having the manufacturer ID and version information encoded so as not to violate the standard protocol, in step 316. Then, the negotiation is omitted and the necessary information is obtained from the information table, in step 310, and a communication starts in step 312.

In the protocol of the present invention, terminals of the same manufacturer can conduct a more rapid communication, as compared to a terminal supporting a standard protocol only, because the negotiation procedure in an early stage of the standard protocol can be completed using only one request and one acknowledgement. The standby time in an early stage of multimedia communication is reduced from about four to eight seconds in the standard protocol only-based terminal to about one second in the present invention. Further, the present invention also supports the standard protocol, providing cross-manufacturer compatibility in inter-terminal communication.

In conclusion, the present invention offers the advantages of a remarkably rapid multimedia communication for terminals of the same manufacturer with cross-manufacturer compatibility maintained.

While the present invention has been described in detail with reference to the specific embodiment, it is a mere exemplary application. In particular, the present invention is applicable to H.324, H.323, and the like as well as H.245 which has been exemplarily described in the embodiment. Thus, it is to be clearly understood that many variations can be made by anyone skilled in the art within the scope and spirit of the present invention.

What is claimed is:

1. An inter-terminal communication protocol method comprising the steps of:
   (1) causing a first terminal to determine whether a second terminal uses an identical predetermined protocol by sending a bit stream which does not violate a standard protocol before a negotiation of the standard protocol;
   (2) omitting the negotiation, detecting necessary information, which would otherwise be obtained from the negotiation, from a prepared information table, and starting a communication, if the first and second terminals use the same predetermined protocol; and
   (3) initiating the negotiation if the second terminal does not use the identical predetermined protocol.

2. The inter-terminal communication protocol method of claim 1, wherein the determination of step (1) is made by comparing manufacturer IDs and versions of the first and second terminals.

3. An inter-terminal communication protocol method comprising the steps of:

causing a first terminal to send a second terminal a bit stream containing terminal manufacturer ID and version information encoded in a predetermined protocol specific to a manufacturer, but which does not violate a standard protocol, in an early stage before a negotiation based on the standard protocol;

causing the first terminal to await an acknowledge bit stream from the second terminal;

causing the second terminal to send the first terminal the acknowledge bit stream containing the terminal manufacturer ID and version information and encoded not to violate the standard protocol, if the second terminal uses the predetermined protocol;

causing the second terminal to neglect the received bit stream if the second terminal does not use the predetermined protocol;

causing the terminal to omit the negotiation, detect information which would otherwise be obtained from the negotiation from a prepared information table based on the version information, and initiate a communication with the second terminal, upon reception of the acknowledge bit stream from the second terminal during a waiting period; and causing the first terminal to initiate the negotiation if the terminal fails to receive the acknowledge bit stream from the other terminal until the waiting period is expired.

* * * * *